(12) United States Patent
Yu et al.

(10) Patent No.: US 7,018,059 B2
(45) Date of Patent: Mar. 28, 2006

(54) DIRECT TYPE BACKLIGHT MODULE

(75) Inventors: Chuan-Pei Yu, Ilan (TW); Chien-Hung Kuo, Taichung (TW); Han-Chou Liu, Hsinchu (TW)

(73) Assignee: AU Optronics Corp., Hsinchu (TW)

( * ) Notice: Subject to any disclaimer, the term of this patent is extended or adjusted under 35 U.S.C. 154(b) by 119 days.

(21) Appl. No.: 10/683,931

(22) Filed: Oct. 10, 2003

(65) Prior Publication Data

US 2005/0007755 A1 Jan. 13, 2005

(30) Foreign Application Priority Data

Jul. 8, 2003 (TW) ............................... 92118560 A

(51) Int. Cl.
*G01D 11/28* (2006.01)
*F21V 8/00* (2006.01)
(52) U.S. Cl. ..................... 362/29; 362/615; 362/629
(58) Field of Classification Search ............ 362/31, 362/29, 629, 613, 615; 349/112
See application file for complete search history.

(56) References Cited

U.S. PATENT DOCUMENTS

| | | | | |
|---|---|---|---|---|
| 4,985,809 A | * | 1/1991 | Matsui et al. | 362/31 |
| 5,057,974 A | * | 10/1991 | Mizobe | 362/26 |
| 5,249,104 A | * | 9/1993 | Mizobe | 362/31 |
| 6,239,851 B1 | * | 5/2001 | Hatazawa et al. | 349/62 |
| 2002/0113924 A1 | * | 8/2002 | Saito et al. | 349/112 |
| 2003/0026085 A1 | * | 2/2003 | Ueda et al. | 362/31 |
| 2003/0081402 A1 | * | 5/2003 | Jeon et al. | 362/26 |
| 2003/0184993 A1 | * | 10/2003 | Yamada | 362/31 |
| 2004/0004684 A1 | * | 1/2004 | Yang et al. | 349/112 |
| 2004/0032725 A1 | * | 2/2004 | Hsieh et al. | 362/31 |

FOREIGN PATENT DOCUMENTS

| | | | |
|---|---|---|---|
| JP | 06095105 | * | 4/1994 |
| JP | 2001-356702 | | 12/2001 |

* cited by examiner

*Primary Examiner*—Alan Cariaso
*Assistant Examiner*—James W Cranson, Jr.
(74) *Attorney, Agent, or Firm*—Ladas & Parry LLP

(57) ABSTRACT

A direct type backlight module. The backlight module includes a reflector, a diffuser plate, lamps, and a light-distributing device. The diffuser plate is disposed on the reflector, and the lamps are disposed between the reflector and the diffuser plate. The light-distributing device is disposed between the lamp and the diffuser plate, and guides light from the lamp to the diffuser plate. A space is defined between the light-distributing device and the diffuser plate.

16 Claims, 3 Drawing Sheets

DIRECT TYPE BACKLIGHT MODULE

BACKGROUND OF THE INVENTION

1. Field of the Invention

The invention relates to a direct type backlight module; in particular, the invention relates to a direct type backlight module that enhances light uniformity.

2. Description of the Related Art

In the display unit of a liquid crystal display, a backlight module is generally utilized as a light source. Depending on the structure, the backlight module can be an edge type or a direct type. Since this invention seeks to improve the direct type backlight module, the description of the edge type backlight module is omitted.

As shown in FIG. 1, a direct type backlight module 10 includes a frame 11, a reflector 12, a plurality of lamps 13, a diffuser plate 14, a prism sheet 15, a diffuser sheet 16, and a liquid crystal panel 17. The reflector 12 is disposed in the frame 11 and is located at the bottom of the direct type backlight module 10, and reflects light from the lamps 13 out of the backlight module 10. The lamps 13 are utilized as the light source of the direct type backlight module 10. The diffuser plate 14 is disposed on the reflector 11 in such a manner that the lamps 13 are covered by the diffuser plate 14, and enhance the brightness of the front side of the backlight module 10. The prism sheet 15, the diffuser sheet 16, and the liquid crystal panel 17 are disposed on the diffuser plate 14.

The direct type backlight module 10, however, has the following disadvantage. To uniformly distribute light from the backlight module 10, a plurality of print dots (inks) 141 are generally printed on the diffuser plate 14. Part of the light may be absorbed by the print dots, and part of the light may be reflected back to the reflector 12. Thus, the light-utilization efficiency of the entire backlight module suffers.

In Japanese Publication No. 2001-356702, a direct type backlight module 20 that solves the above problem is disclosed. As shown in FIG. 2, two diffuser plates 22, 23 are disposed above the lamps 21, and an air layer 24 is formed between the diffuser plates 22, 23. Specifically, in the direct type backlight module 20, an additional diffuser plate is disposed to enhance the light uniformity. The disadvantage of the backlight module 20 is that an additional diffuser plate can diffuse the light, but cannot actually guide the light to the front side of the backlight module. Thus, light uniformity is not enhanced.

SUMMARY OF THE INVENTION

In order to address the disadvantages of the aforementioned backlight module, the invention provides a direct type backlight module that enhances light uniformity.

Accordingly, the invention provides a direct type backlight module including a reflector, a diffuser plate, lamps, and a light-distributing device. The diffuser plate is disposed on the reflector, and the lamps are disposed between the reflector and the diffuser plate. The light-distributing device is disposed between the lamp and the diffuser plate, and guides light from the lamp to the diffuser plate. A space is defined between the light-distributing device and the diffuser plate.

In a preferred embodiment, the light-distributing device includes a transparent plate, and the transparent plate is formed with a plurality of print dots on a surface facing the lamp. The print dot is an ink.

In another preferred embodiment, the light-distributing device includes a transparent plate, and the transparent plate is formed with a plurality of print dots on a surface facing the diffuser plate.

In another preferred embodiment, the light-distributing device includes a prism sheet. The prism sheet includes a prism pattern, and the prism pattern is formed on a surface facing the lamp, or on a surface facing the diffuser plate, or both.

In another preferred embodiment, the light-distributing device includes a metallic film with a plurality of holes thereon. The metallic film may be composed of aluminium, copper, another metal, an alloy, or a metallic fiber.

In another preferred embodiment, the backlight module further includes a prism sheet disposed on the diffuser plate.

In another preferred embodiment, the light-distributing device includes a light guide plate with a plurality of indexes of refraction thereon. The indexes of refraction are increased from a center of the light guide plate to a periphery of the light guide plate.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
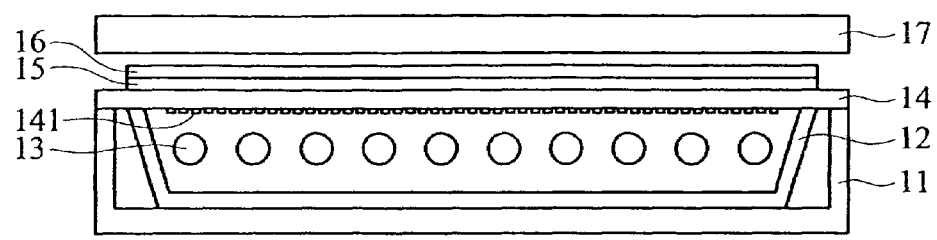
FIG. 1 a schematic view of a conventional direct type backlight module.
Figure 2:
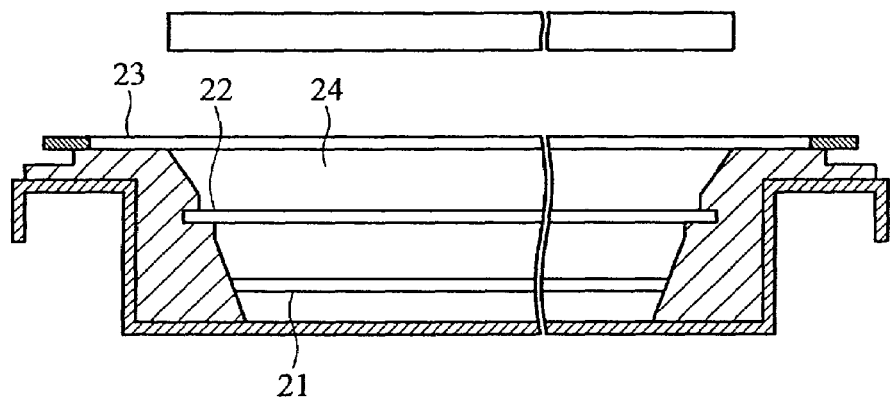
FIG. 2 is a schematic view of another conventional direct type backlight module.
Figure 3:
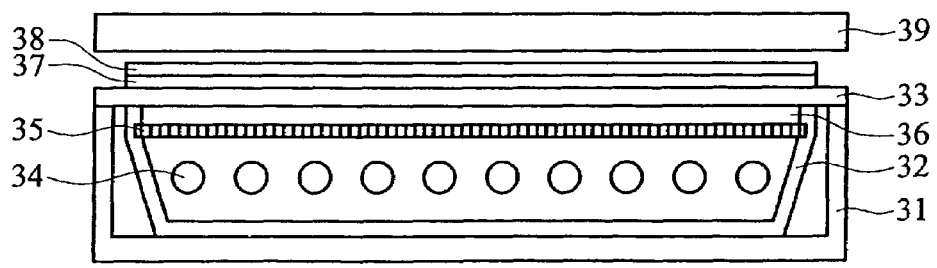
FIG. 3 is a schematic view of a direct type backlight module as disclosed in this invention.

FIG. 3 shows a direct type backlight module 30 as disclosed in the invention. The direct type backlight module 30 includes a frame 31, a reflector 32, a diffuser plate 33, a plurality of lamps 34, and a light-distributing device 35. The frame 31 is used as a base of the backlight module 30, and supports the elements of the backlight module 30. The reflector 32 is disposed on the frame 31, and reflects the light from the lamps 34 out of the backlight module 30.

The diffuser plate 33 is disposed on the reflector 32, and the lamps 34 are disposed between the reflector 32 and the diffuser plate 33.

In the backlight module 30 of this invention, the light-distributing device 35 is additionally disposed between the lamps 34 and the diffuser plate 33. A space 36 is defined between the light-distributing device 35 and the diffuser plate 33. The light-distributing device 35 distributes light from the lamps 34, and guides the light to the diffuser plate 33. Thus, the light uniformity can be enhanced, and the Mura effect can be inhibited.

In FIG. 3, the light-distributing device 35 is used as a light guide plate, and includes a transparent plate as a main body. The transparent plate is formed with a plurality of print dots on an upper surface facing the diffuser plate 33 or a bottom surface facing the lamps 34. It is understood that each of the print dots may be an ink.

Furthermore, referring to FIG. 3, a prism plate 37, a diffuser film 38, and a liquid crystal panel 39 are disposed on the diffuser plate 35. Since their structure and manner of deposition are the same as those of the conventional backlight module, their description is omitted.

As stated above, since the light-distributing device is additionally disposed in the direct type backlight module of this invention, the light uniformity can be optimized.

Figure 4:
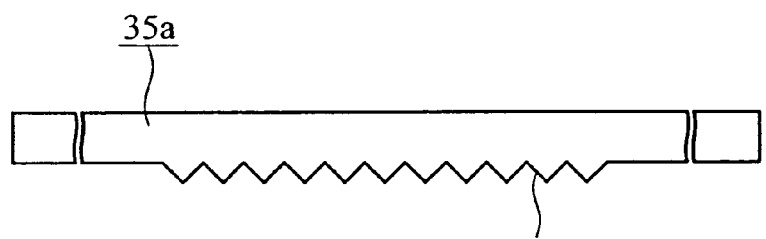
FIG. 4 is a schematic view of a variant embodiment of a light-distributing device as disclosed in this invention.

FIG. 4 shows a variant embodiment of the light-distributing device of this invention. In FIG. 4, the light-distributing device 35a is a prism plate to distribute the light outwardly. The prism plate 35a includes prism patterns 351a, and the prism patterns 351a are formed on a bottom surface as shown in FIG. 4. In addition, the prism patterns may be formed on an upper surface, or formed on both of the upper surface and the bottom surface. When the prism patterns are formed on the bottom surface of the prism plate, they can distribute the light. When the prism patterns are formed on the upper surface of the prism plate, they can concentrate the light and guide the light to the diffuser plate.

By means of the light-distributing device shown in FIG. 4, the light uniformity of the backlight module can be optimized. Additionally, the process for printing the printing dots on the diffuser plate (or the light-distributing device shown in FIG. 3) can be omitted, thus simplifying the process of the backlight module.

Figure 5:
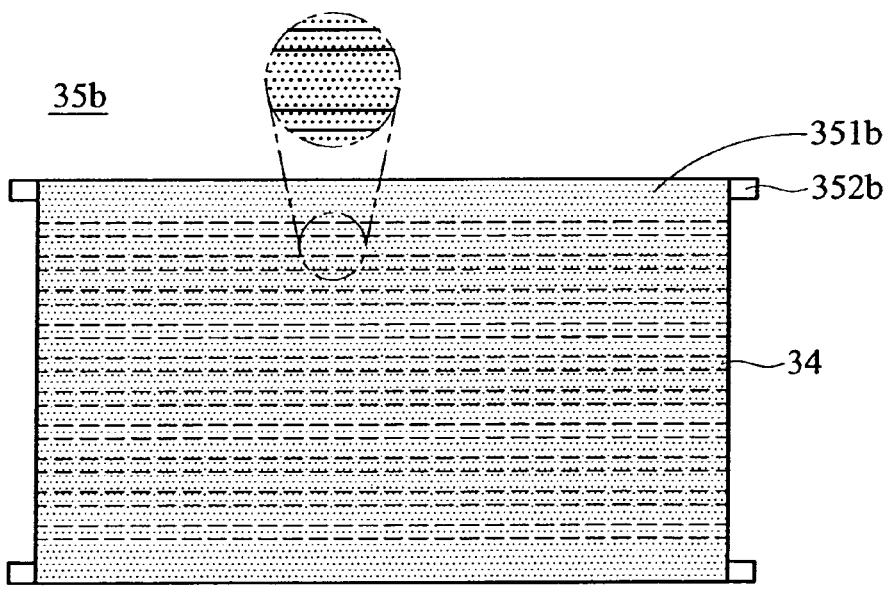
FIG. 5 is a schematic view of another variant embodiment of a light-distributing device as disclosed in this invention.

FIG. 5 shows another variant embodiment of the light-distributing device of this invention. In FIG. 5, the light-distributing device 35b may be a metallic film with a plurality of holes 351b thereon. It is noted that the lamps 34 are located below the light-distributing device 35b are shown by the dashed lines in FIG. 5.

In addition, the metallic film may be composed of a material with high thermal conductivity, such as aluminium or copper. Heat-dissipating plates 352b are disposed at corners of the light-distributing device 35b to dissipate the heat.

By means of the light-distributing device shown in FIG. 5, the light uniformity of the backlight module can be optimized, and the process of the backlight module can be simplified. Moreover, since the light-distributing device is composed of a metallic film, the thickness of the entire backlight module can be minimized. Thus, the backlight module can be more compact.

Figure 6:
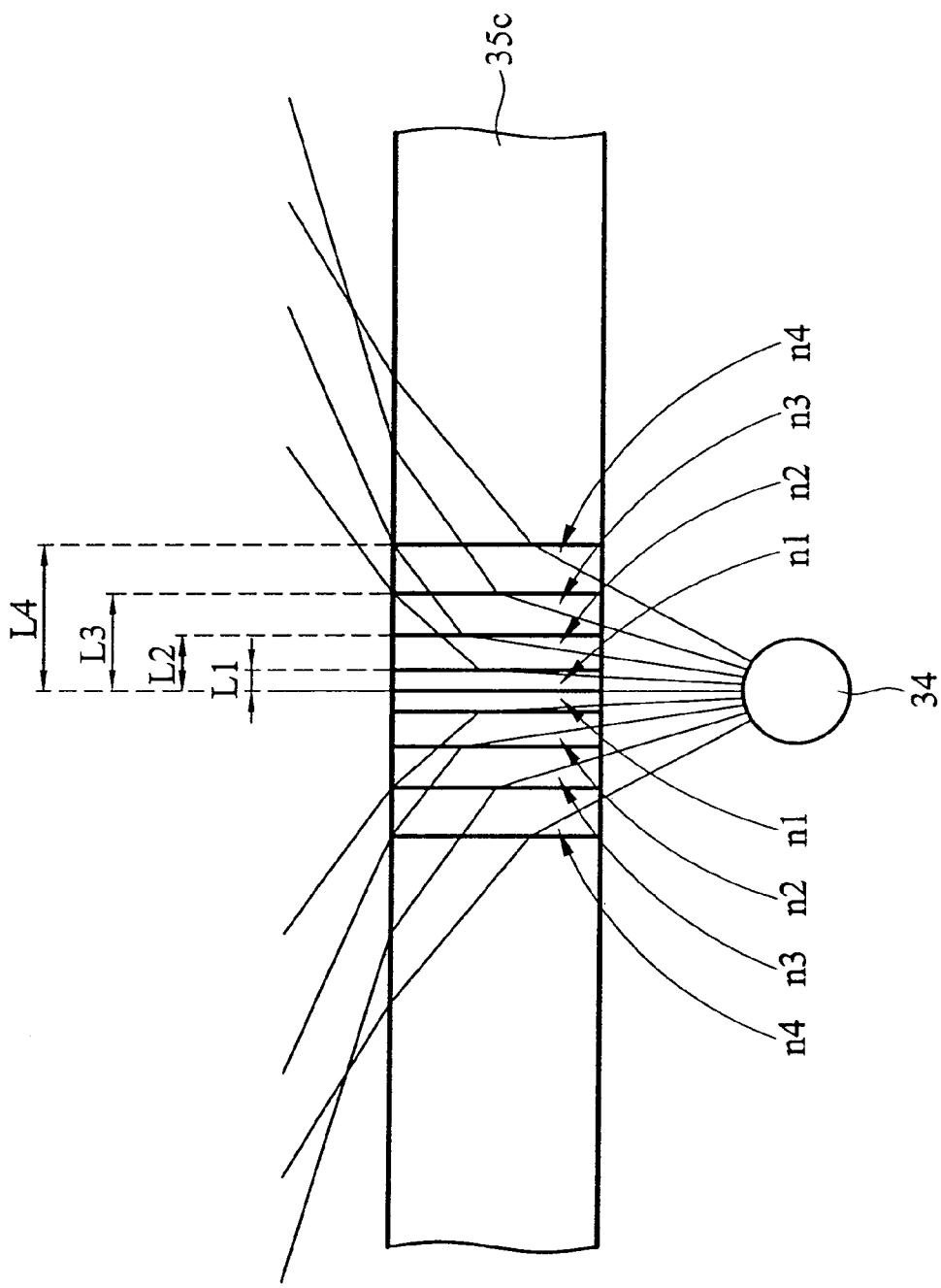
FIG. 6 is a schematic view of another variant embodiment of a light-distributing device as disclosed in this invention.

FIG. 6 shows another variant embodiment of the light-distributing device of this invention. In FIG. 6, the light-distributing device 35c is a light guide plate with various indexes of refraction thereon. That is, the light guide plate 35c includes a plurality of indexes of refraction thereon, and its indexes of refraction are different at different regions. The detailed description is described in the following.

The Snell Law $[n1 \times \sin(w1) = n2 \times \sin(w2)]$ is described prior to the detailed description, wherein n represents the index of refraction of the material, w represents the angle between the light-emitting direction and the normal direction, and 1, 2 represent different material with different index of refraction respectively. That is, the emitting direction of the light is changed by the different materials with different indexes of refraction. The light uniformity of the backlight module may be obtained by such an optical property.

As stated above, the light guide plate 35c can be divided into several regions with different indexes of refraction as shown in FIG. 6. The indexes of refraction n1, n2, n3, n4 and the length L1, L2, L3, L4 of different regions can be controlled to obtain the light uniformity of the backlight module. Since the position right above the lamp 34 is brightest, the index of refraction n1 of the central region is set to be smaller than the surrounding area. In addition, total-reflection can be avoided, and the light gathering effect cannot be generated. The indexes of refraction are increased from the central region of the light guide plate to its periphery while adjusting the length L. Thus, the light uniformity of the backlight module can be optimized.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A direct type backlight module comprising:
   a reflector;
   a diffuser plate disposed on the reflector;
   a lamp disposed between the reflector and the diffuser plate; and
   a light-distributing device, comprising a metallic film with a plurality of holes thereon and disposed between the lamp and the diffuser plate, for guiding light from the lamp to the diffuser plate, wherein a space is defined between the light-distributing device and the diffuser plate.

2. The backlight module as claimed in claim 1, wherein the light-distributing device includes a transparent plate and the transparent plate is formed with a plurality of print dots on a surface facing the lamp.

3. The backlight module as claimed in claim 2, wherein each of the print dots is an ink.

4. The backlight module as claimed in claim 1, wherein the light-distributing device includes a transparent plate and the transparent plate is formed with a plurality of print dots on a surface facing the diffuser plate.

5. The backlight module as claimed in claim 4, wherein each of the print dots is an ink.

6. The backlight module as claimed in claim 1, wherein the light-distributing device includes a prism sheet.

7. The backlight module as claimed in claim 6, wherein the prism sheet includes a prism pattern and the prism pattern is formed on a surface facing the lamp, or on a surface facing the diffuser plate, or on both the surface facing the lamp and the surface facing the diffuser plate.

8. The backlight module as claimed in claim 1, wherein the metallic film is composed of aluminum or copper.

9. The backlight module as claimed in claim 1, further comprising a prism sheet disposed on the diffuser plate.

10. A direct type backlight module comprising:
    a reflector;
    a diffuser plate disposed on the reflector;
    a lamp disposed between the reflector and the diffuser plate; and
    a light-distributing device, comprising a light guide plate with a plurality of indexes of refraction thereon and disposed between the lamp and the diffuser plate, for guiding light from the lamp to the diffuser plate, wherein a space is defined between the light-distributing device and the diffuser plate;

wherein the indexes of refraction are increased from a center of the light guide plate to a periphery of the light guide plate.

11. The backlight module as claimed in claim 10, wherein the light-distributing device includes a transparent plate and the transparent plate is formed with a plurality of print dots on a surface facing the lamp.

12. The backlight module as claimed in claim 11, wherein each of the print dots is an ink.

13. The backlight module as claimed in claim 10, wherein the light-distributing device includes a transparent plate and the transparent plate is formed with a plurality of print dots on a surface facing the diffuser plate.

14. The backlight module as claimed in claim 13, wherein each of the print dots is an ink.

15. The backlight module as claimed in claim 10, wherein the light-distributing device includes a prism sheet.

16. The backlight module as claimed in claim 15, wherein the prism sheet includes a prism pattern and the prism pattern is formed on a surface facing the lamp, or on a surface facing the diffuser plate, or on both the surface facing the lamp and the surface facing the diffuser plate.

* * * * *